(12) United States Patent
Lan et al.

(10) Patent No.: US 11,854,261 B2
(45) Date of Patent: *Dec. 26, 2023

(54) LINKING TO SOCIAL EXPERIENCES IN ARTIFICIAL REALITY ENVIRONMENTS

(71) Applicant: Meta Platforms Technologies, LLC, Menlo Park, CA (US)

(72) Inventors: Tian Lan, Bellevue, WA (US); Mamta Jain, Los Altos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,306

(22) Filed: Dec. 19, 2022

(65) Prior Publication Data
US 2023/0117623 A1    Apr. 20, 2023

Related U.S. Application Data

(63) Continuation of application No. 16/825,155, filed on Mar. 20, 2020, now Pat. No. 11,568,641.

(51) Int. Cl.
*G06V 20/20* (2022.01)
*G06F 16/954* (2019.01)
*G06T 19/00* (2011.01)
*G06Q 50/00* (2012.01)
*G06F 16/955* (2019.01)

(52) U.S. Cl.
CPC ............ *G06V 20/20* (2022.01); *G06F 16/954* (2019.01); *G06F 16/9558* (2019.01); *G06Q 50/01* (2013.01); *G06T 19/006* (2013.01)

(58) Field of Classification Search
CPC ... G06F 16/954; G06F 16/9558; G06Q 50/01; G06T 19/006
See application file for complete search history.

(56) References Cited

U.S. PATENT DOCUMENTS

| | | | |
|---|---|---|---|
| 10,504,513 B1* | 12/2019 | Gray | G10L 15/1815 |
| 2012/0004956 A1* | 1/2012 | Huston | G06Q 30/0241 |
| | | | 705/14.1 |
| 2012/0194419 A1* | 8/2012 | Osterhout | G02B 27/017 |
| | | | 345/156 |
| 2017/0273044 A1* | 9/2017 | Alsina | H04N 21/4788 |
| 2019/0318129 A1* | 10/2019 | David | H04L 67/104 |
| 2020/0160985 A1* | 5/2020 | Kusuma | G16H 30/40 |

* cited by examiner

*Primary Examiner* — Ming Wu
(74) *Attorney, Agent, or Firm* — Baker Botts L.L.P.

(57) ABSTRACT

In one embodiment, a computing system may receive, from a first electronic device associated with a first user, a first request to generate a link associated with an artificial reality application and an action to be performed by the artificial reality application. The computing system may then generate a link to instructions that are executable on an artificial reality device to cause the artificial reality device to launch the artificial reality application and perform the action. The computing system may then receive, from a second electronic device associated with a second user, an indication that the second user activated the link on the second electronic device, and send the instructions associated with the link to an artificial reality device associated with the second user to cause the artificial reality device associated with the second user to launch the artificial reality application and perform the action.

19 Claims, 6 Drawing Sheets

LINKING TO SOCIAL EXPERIENCES IN ARTIFICIAL REALITY ENVIRONMENTS

PRIORITY

This application is a continuation under 35 U.S.C. § 120 of U.S. patent application Ser. No. 16/825,155, filed 20 Mar. 2020, which is incorporated herein by reference.

TECHNICAL FIELD

This disclosure generally relates to artificial reality environments, and, more specifically, to linking to social experiences in artificial reality environments.

BACKGROUND

A virtual world may generally include a computer-generated environment that includes virtual reality artifacts such as virtual locations, virtual events, and the like. Such a virtual world and its artifacts typically include various virtual applications (e.g., virtual video games), which may allow users to utilize these artifacts by manipulating their virtual presence in the form of their computer-generated representation commonly known as avatars. Certain virtual reality applications (e.g., virtual reality video games, virtual reality tours, virtual reality interfaces) may allow different users to meet up to socialize and/or to collaborate on one or more tasks within the virtual reality applications. Particularly, when a particular user desires to initiate a social meetup with other virtual reality users (e.g., to participate in a video game together, to view a video together, to listen to music together), the user may initiate the social meetup by verbally communicating (i.e., non-electronically and outside of the virtual reality application) with the other virtual reality users and manually scheduling a precise time and place that each user may is to engage its virtual reality device, a precise and specific application to be launched, and imprecisely determining a singularly designated virtual meetup point (e.g., lobby) within the virtual reality application. As it may be appreciated, such an inefficient and cumbersome process may be susceptible to frequent miscommunications between the different users, misdirection with respect to users navigating to the singularly designated virtual meetup point, and unacceptably long wait times for all of the users to navigate to the singularly designated virtual meetup point.

SUMMARY OF CERTAIN EMBODIMENTS

The present techniques include generating and publishing deep links to rich presence destinations within artificial reality applications, in accordance with the presently disclosed embodiments. In certain embodiments, a service platform may receive from a first electronic device associated with a first user a first request to generate a link associated with an artificial reality application and an action to be performed by the artificial reality application. For example, the service platform (e.g., platform as a service (PaaS) or other cloud-based computing architecture) may be communicatively coupled (e.g., over a network) to a number of artificial reality devices, which may each be suitable for executing various artificial reality applications. In some embodiments, the service platform may receive a request from the first electronic device associated with the first user to generate one or more deep links to a specific destination within, for example, an artificial reality application or experience corresponding to the first user. For example, in some embodiments, the first electronic device may include an application programming interface (API) or other software service that may, for example, pass requests or other data between the first electronic device and the service platform.

In certain embodiments, the service platform may then generate, in response to the first request, a link to instructions that are executable on an artificial reality device to cause the artificial reality device to launch the artificial reality application and perform the action. For example, in one embodiment, the service platform may generate one or more deep links to a specific destination within, for example, the artificial reality application or experience corresponding to the first user. In one embodiment, the service platform may generate a single deep link in response to the first request. In another embodiment, the service platform may generate a number of deep links in response to the first request, and may then store the number of deep links inside a queue or a stack. In certain embodiments, the service platform may then receive from a second electronic device associated with a second user an indication that the second user activated the link on the second electronic device.

For example, in one embodiment, the service platform may receive from the second electronic device an indication that the second user activated (e.g., clicked-on) the deep link on the second electronic device. In one embodiment, the deep link may be launchable or selectable on the first electronic device associated with the first user and the second electronic device associated with the second user, which may each include an electronic device that is incapable of executing an artificial reality application. Thus, in accordance with the presently disclosed embodiments, the destination or application to which the deep link is directed may be instantiated on an artificial reality device (e.g., electronic device capable of executing artificial reality applications) associated with the first user or an artificial reality device (e.g., electronic device capable of executing artificial reality applications) associated with the second user once the one or more deep links are launched or selected on the first electronic device or the second electronic device, respectively.

Particularly, in some embodiments, the service platform may send the instructions associated with the link to an artificial reality device associated with the second user to cause the artificial reality device associated with the second user to launch the artificial reality application and perform the action. For example, the service platform may provide data to an artificial reality device corresponding to the second user, such that once the second user launches or selects the deep link on the second electronic device, the artificial reality application or experience corresponding to first user may be instantiated on the artificial reality device corresponding to the second user at the particular destination to which the launched deep link is directed. That is, the deep link may "teleport" (e.g., virtually transport instantaneously or near-instantaneously) users directly to a particular destination (e.g., a predefined virtual location, a virtual place, a virtual community, a virtual lobby, a virtual microcosm, a virtual macrocosm, a video gaming level, a video gaming competition, a video gaming mode, a particular longitudinal and latitudinal intersection, or other particular position or point in space for user join-ups within a particular artificial reality application) within a particular application or experience.

As such, the present techniques of generating and publishing deep links to rich presence destinations within artificial reality applications may facilitate users of artificial reality devices in directly joining with associated users (e.g., friends) in experiences within artificial reality applications. Specifically, the present techniques may allow for the engendering of an artificial reality cosmos that is perceptible and navigable in the very same manner as would be a real-world destination (e.g., real-world place). Thus, the present techniques may allow users of artificial reality applications and devices to more efficiently navigate (e.g., instantaneously or near-instantaneously) to and from different destinations across artificial reality environments, and, further, to more efficiently and meaningfully associate and collaborate with other users of artificial reality applications and devices across various artificial reality environments.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
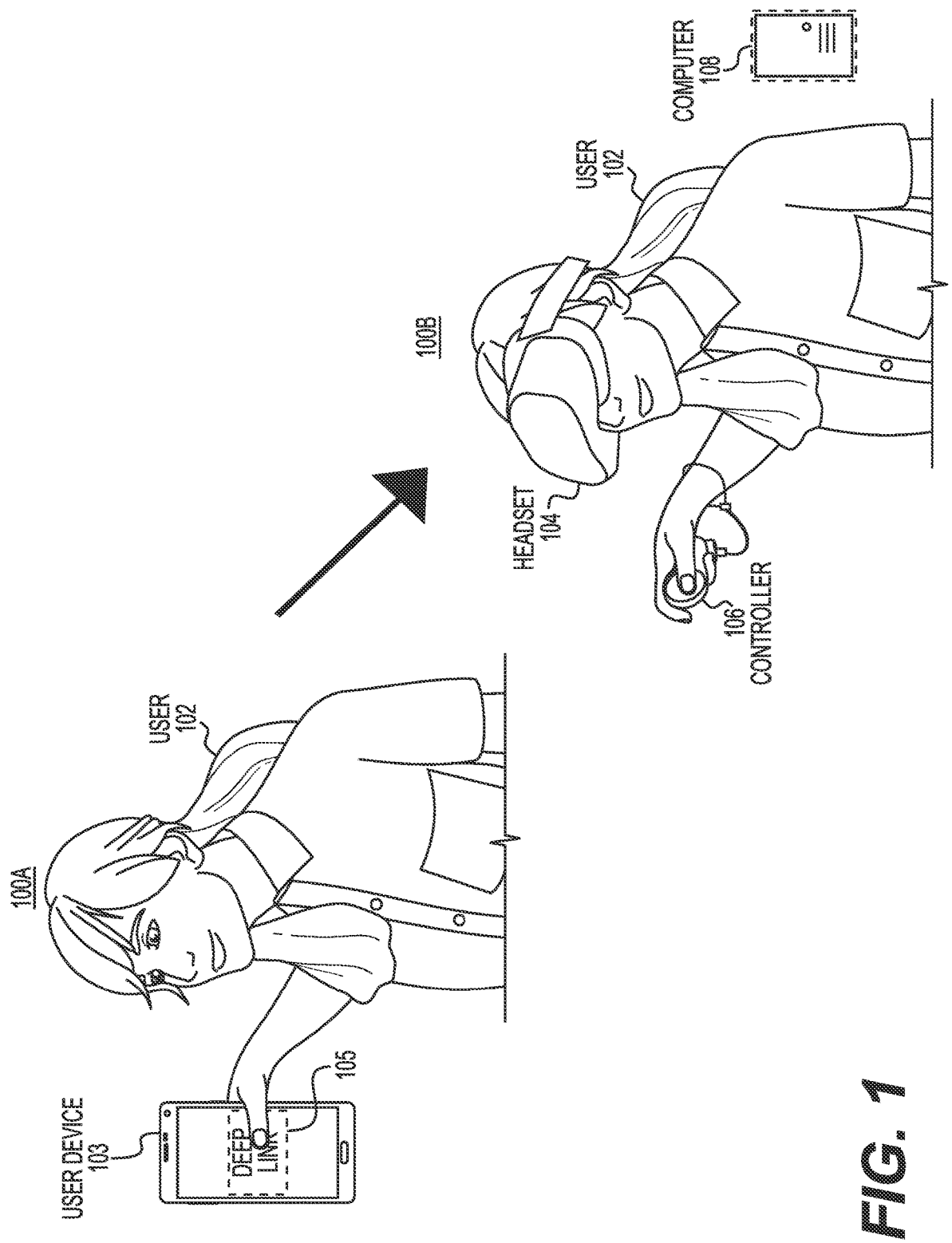
FIG. 1 illustrates an example artificial reality system, in accordance with the present embodiments.

A virtual world may generally include a computer-generated environment that includes virtual reality artifacts such as virtual locations, virtual events, and the like. Such a virtual world and its artifacts typically include various virtual applications (e.g., virtual video games), which may allow users to utilize these artifacts by manipulating their virtual presence in the form of their computer-generated representation commonly known as avatars. Certain virtual reality applications (e.g., virtual reality video games, virtual reality tours, virtual reality interfaces) may allow different users to meet up to socialize and/or to collaborate on one or more tasks within the virtual reality applications. Particularly, when a particular user desires to initiate a social meetup with other virtual reality users (e.g., to participate in a video game together, to view a video together, to listen to music together), the user may initiate the social meetup by verbally communicating (i.e., non-electronically and outside of the virtual reality application) with the other virtual reality users and manually scheduling a precise time and place that each user may is to engage its virtual reality device, a precise and specific application to be launched, and imprecisely determining a singularly designated virtual meetup point (e.g., lobby) within the virtual reality application. As it may be appreciated, such an inefficient and cumbersome process may be susceptible to frequent miscommunications between the different users, misdirection with respect to users navigating to the singularly designated virtual meetup point, and unacceptably long wait times for all of the users to navigate to the singularly designated virtual meetup point.

Accordingly, the present embodiments include receiving and publishing deep links to rich presence destinations within artificial reality applications, in accordance with the presently disclosed embodiments. In certain embodiments, a service platform may receive from a first electronic device associated with a first user a first request to generate a link associated with an artificial reality application and an action to be performed by the artificial reality application. For example, the service platform (e.g., platform as a service (PaaS) or other cloud-based computing architecture) may be communicatively coupled (e.g., over a network) to a number of artificial reality devices, which may each be suitable for executing various artificial reality applications. In some embodiments, the service platform may receive a request from the first electronic device associated with the first user to generate the deep link to a specific destination within, for example, an artificial reality application or experience corresponding to first user. In certain embodiments, the service platform may then generate, in response to the first request, a link to instructions that are executable on an artificial reality device to cause the artificial reality device to launch the artificial reality application and perform the action.

In certain embodiments, the service platform may then receive from a second electronic device associated with a second user an indication that the second user activated the link on the second electronic device. Specifically, in some embodiments, the service platform may send the instructions associated with the link to an artificial reality device associated with the second user to cause the artificial reality device associated with the second user to launch the artificial reality application and perform the action. For example, the service platform may provide data to an artificial reality device corresponding to the second user, such that once the second user launches or selects the deep link on the second electronic device, the artificial reality application or experience corresponding to first user may be instantiated on the artificial reality device corresponding to the second user at the particular destination to which the launched deep link is directed.

As such, the present techniques of generating and publishing deep links rich presence destinations (e.g., contextual virtual locations or places) within artificial reality applications may facilitate users of artificial reality devices in directly joining with associated users (e.g., friends) in experiences within artificial reality applications by engendering an artificial reality cosmos that is perceived and navigable in the very same manner as would be a real-world destination (e.g., real-world place). Thus, the present techniques may allow users of artificial reality applications and devices to more efficiently navigate (e.g., instantaneously or near instantaneously) to and from different destinations across artificial reality environments, and, further, to more efficiently and meaningfully associate and collaborate with other users of artificial reality applications and devices across various artificial reality environments.

As used herein, "artificial reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "artificial reality" content may include completely computer-generated content or partially computer-generated content combined with captured content (e.g., real-world images). In some embodiments, the "artificial reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "artificial reality" may be associated with applications, products, accessories, services, or a combination thereof, that, for example, may be utilized to create content in artificial reality and/or utilized in (e.g., perform activities) an artificial reality. Thus, "artificial reality" content may be implemented on various platforms, including a head-mounted device (HMD) connected to a host computer system, a standalone HMD, a mobile device or computing system, or any other hardware platform capable of providing artificial reality content to one or more viewers.

Furthermore, a "destination" may refer to any user defined or developer defined artificial reality location, environment, entity, object, position, user action, domain, vector space, dimension, geometry, coordinates, array, animation, applet, image, text, blob, file, page, widget, occurrence, event, instance, state, or other abstraction that may be defined within an artificial reality application to represent a reference point or a join-up point by which users of the artificial reality application may readily identify and directly navigate (e.g., instantaneously or near-instantaneously) thereto. For example, in some embodiments, a "destination" may correspond to a predefined virtual location, a virtual place, a virtual community, a virtual lobby, a virtual microcosm, a virtual macrocosm, a video gaming level, a video gaming competition (e.g., match), a video gaming mode (e.g., single-player mode, multiplayer mode), a particular longitudinal and latitudinal intersection (e.g., specific coordinates), or other particular position or point in space suitable for user join-ups within a particular artificial reality application. Finally, as used herein, a "deep link" may refer to any link address, pathname, or other locating mechanism that may be utilized or launched to "teleport" (e.g., virtually transport instantaneously or near-instantaneously) artificial reality users to one or more specific destinations within an artificial reality application. For example, in some embodiments, a "deep link" may correspond to a Uniform Resource Locator (URL) or a Universal Resource Indicator (URI) that may be launched within an artificial reality application or outside of the artificial reality application to transport other users to, or allow the other uses to, navigate to one or more specific destinations within an artificial reality application. In one embodiment, a "deep link" may be a link (e.g., website link, hyperlink, URL, URI) that may be launchable or selectable on a first electronic device incapable of executing an artificial reality application, and the destination or application to which the link is directed may be then instantiated on a second electronic device capable of executing the artificial reality application.

With the forgoing in mind, it may be useful to describe an example an artificial reality subsystem for publishing and launching deep links to rich presence destinations, as illustrated by FIG. 1. In certain embodiments, the artificial reality subsystem 100A may include a user 102, which may interact, for example, with an electronic device 103. In one embodiment, the electronic device 103 may include a mobile electronic device (e.g., a mobile phone, a tablet computer, a laptop computer), or any personal electronic device associated with the user 102 that may be incapable of executing an artificial reality application or experience. In some embodiments, as will be further appreciated with respect to FIGS. 2-4, the electronic device 103 may receive a deep link 105. In certain embodiments, as further depicted, the deep link 105 may be selected on the electronic device 103 by the user 102. For example, as will be described in greater detailed below, once the user 102 selects the deep link 105 on the electronic device 103 (e.g., electronic device incapable of executing an artificial reality application or experience) and places on an artificial reality device 104 (e.g., electronic device capable of executing an artificial reality application or experience) associated with the user 102, a particular artificial reality application or experience corresponding to the deep link 105 may be instantiated on the artificial reality device 104.

In certain embodiments, as further illustrated by the FIG. 1, the artificial reality subsystem 100B may include an artificial reality device 104, a controller 106, and a computing system 108. The user 102 may wear the artificial reality device 104, which may display visual artificial reality content to the user 102. For example, in one embodiment, the artificial reality device 104 may display to the user 102 a particular artificial reality application or experience to which the deep link 105 is directed. In some embodiments, the artificial reality device 104 may include an audio device that may provide audio artificial reality content to the user 102. The artificial reality device 104 may also include one or more cameras which can capture images and videos of environments. The artificial reality device 104 may include an eye tracking system to determine the vergence distance of the user 102. In some embodiments, the artificial reality device 104 may include a head-mounted display (HDM). The controller 106 may include a trackpad and one or more buttons. The controller 106 may receive inputs from the user 102 and relay the inputs to the computing system 108. The controller 206 may also provide haptic feedback to the user 102. The computing system 108 may be connected to the artificial reality device 104 and the controller 106 through cables or wireless connections. The computing system 108 may control the artificial reality device 104 and the controller 106 to provide the artificial reality content to and receive inputs from the user 102. The computing system 108 may be a standalone host computer system, an on-board computer system integrated with the artificial reality device 104, a mobile electronic device, or any other hardware platform capable of providing artificial reality content to and receiving inputs from the user 102.

Figure 2:
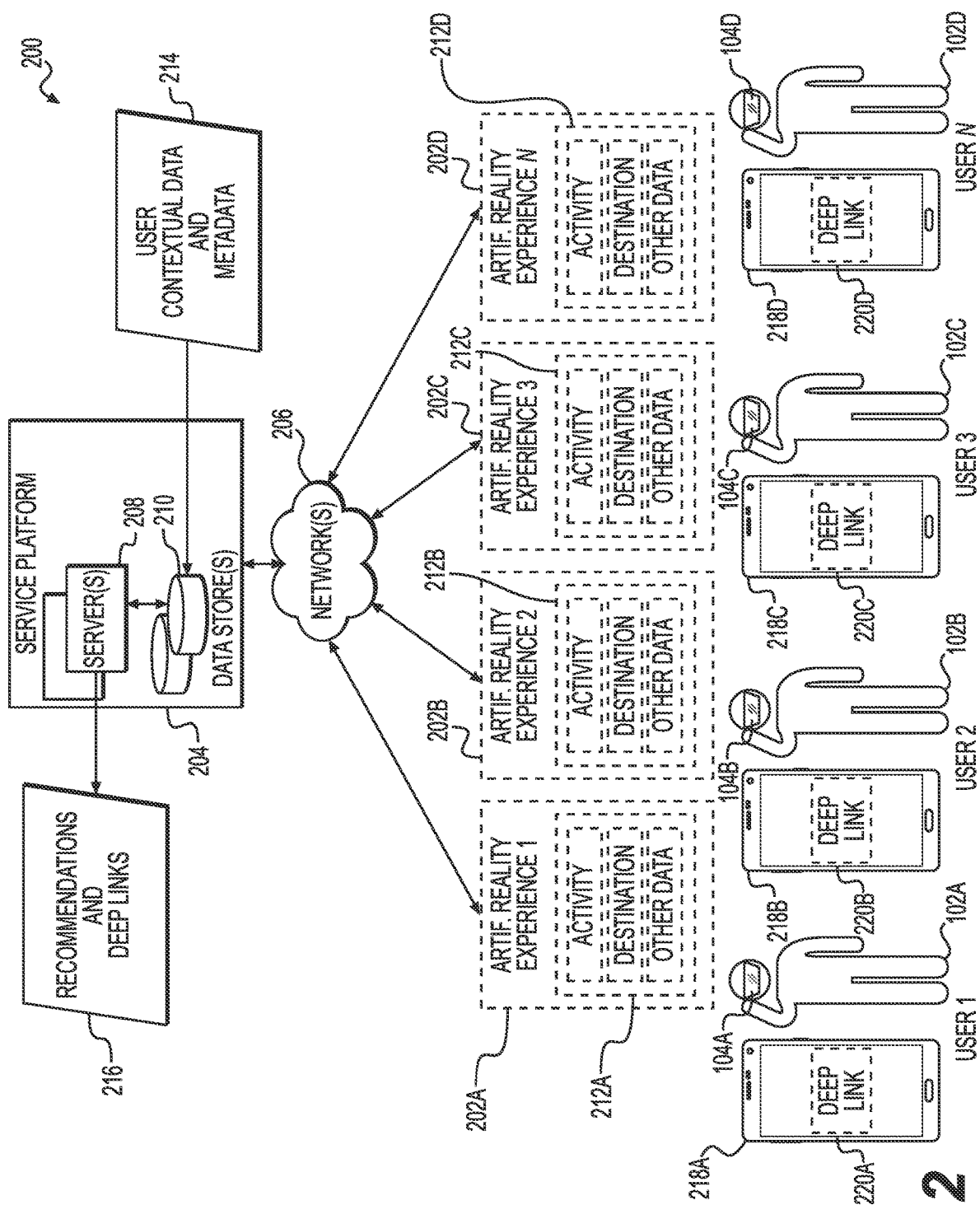
FIG. 2 illustrates an example artificial reality environment, in accordance with the present embodiments.

Turning now to FIG. 2, an artificial reality environment 200 that may be useful in generating and publishing rich presence destinations within artificial reality applications is illustrated, in accordance with the presently disclosed embodiments. As depicted, the artificial reality environment 200 may include a number of users 102A, 102B, 102C, and 102D each wearing respective artificial reality devices 104A, 104B, 104C, and 104D that may be suitable for allowing the number of users 102A, 102B, 102C, and 102D to engage respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"). Specifically, as depicted by FIG. 2, the respective artificial reality devices 104A, 104B, 104C, and 104D may be coupled to a service platform 204 via one or more network(s) 206. In certain embodiments, the service platform 204 may include, for example, a cloud-based computing architecture suitable for hosting and servicing the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D. For example, in one embodiment, the service platform 204 may include a Platform as a Service (PaaS) architecture, a Software as a Service (SaaS) architecture, and an Infrastructure as a Service (IaaS), or other similar cloud-based computing architecture.

In certain embodiments, as further depicted by FIG. 2, the service platform 204 may include one or more processing devices 208 (e.g., servers) and one or more data stores 210. For example, in some embodiments, the processing devices 208 (e.g., servers) may include one or more general purpose processors, or may include one or more graphic processing units (GPUs), one or more application-specific integrated circuits (ASICs), one or more system-on-chips (SoCs), one or more microcontrollers, one or more field-programmable gate arrays (FPGAs), or any other processing device(s) that may be suitable for providing processing and/or computing support for the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"). Similarly, the data stores 210 may include, for example, one or more internal databases that may be utilized to store information (e.g., user contextual data and metadata 214) associated with the number of users 102A, 102B, 102C, and 102D.

In certain embodiments, as previously noted, the service platform 204 may be a hosting and servicing platform for the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D. For example, in some embodiments, the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") may each include, for example, artificial reality applications such as video gaming applications (e.g., single-player games, multiplayer games), mapping applications, music playback applications, video-sharing platform applications, video-streaming applications, e-commerce applications, social media applications, user interface (UI) applications, or other artificial reality applications the number of users 102A, 102B, 102C, and 102D may experience and navigate therethrough. In one embodiment, each one of the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") may include an artificial reality application that is different from the other ones of the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N").

In certain embodiments, the service platform 204 may track, for example, the destinations, the activity statuses, and/or other contextual data and metadata 214 associated with the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the artificial reality devices 104A, 104B, 104C, and 104D. For example, in some embodiments, the user destinations within the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") may include, for example, one or more predefined virtual locations, virtual places, virtual communities, virtual microcosms, virtual macrocosms, video gaming levels (e.g., total space available for users completing a predetermined obstacle or objection), multiplayer gaming competitions (e.g., matches), or gaming modes (e.g., single-player mode, multiplayer mode, skill level, and so forth) for user join-ups within a particular one of the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"). Similarly, the activity statuses may include, for example, user capacity in a particular one of the artificial reality applications or experiences 202A, 202B, 202C, and 202D or at a particular destination, popularity of a particular one of the artificial reality applications or experiences 202A, 202B, 202C, and 202D or of a particular destination (e.g., trending application or destination), whether a particular one of the users 102A, 102B, 102C, and 102D is joinable in a particular one of the artificial reality applications or experiences 202A, 202B, 202C, and 202D or at a particular destination, a remaining time of a current and active instance within a particular one of the artificial reality applications or experiences 202A, 202B, 202C, and 202D or at particular destination, and so forth.

In certain embodiments, the service platform 204 may continuously receive and store the destinations, the activity statuses, and/or other contextual data and metadata 214 associated with the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D. For example, in one embodiment, the service platform 204 may continuously request (e.g., ping) each of the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") for the user contextual data and metadata 214 at one or more predetermined time intervals (e.g., every 5 s, every 10 s, every 15 s, or every 30 s). For example, in some embodiments, the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D may each include one or more service layer monitors that may be utilized to monitor and collect the destinations, the activity statuses, and/or other contextual data and metadata 214, and continuously provide the destinations, the activity statuses, and/or other contextual data and metadata over a network 206 to the service platform 204.

For example, in some embodiments, the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D may include one or more service layer monitors that may be utilized to monitor and collect destination data, activity status data, and/or other user contextual data and metadata 214 (and provide to the service platform 204) as the users 102A (e.g., "User 1), 102B (e.g., "User 2"), 102C (e.g., "User 3"), and 102D (e.g., "User N") navigate various artificial reality environments. The one or more service layer monitors on the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the respective artificial reality devices 104A, 104B, 104C, and 104D may also monitor for metadata such as an identity of the particular user 102A, 102B, 102C, and 102D associated with the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"), string or identifier associated with, for example, a predetermined user event, user action, or user activity.

In certain embodiments, as further depicted by FIG. 2, the one or more service layer monitors may provide the destination data, activity status data, and/or other user contextual data and metadata 214 to the service platform 204. The service platform 204 may then aggregate and store the received destination data, activity status data, and/or other user contextual data and metadata 214 for each of the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") being currently utilized to, for example, the one or more data stores 210 (e.g., internal databases). In some embodiments, the service platform 204 may aggregate and store the received data for each of the respective artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") together with the corresponding one the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N").

In some embodiments, the service platform 204 may then identify one or more target users of the respective users 102A (e.g., "User 1"), 102B (e.g., "User 2"), 102C (e.g., "User 3"), and 102D (e.g., "User N"). For example, in some embodiments, the service platform 204 may detect that a particular one of the respective users 102A (e.g., "User 1"), 102B (e.g., "User 2"), 102C (e.g., "User 3"), and 102D (e.g., "User N") has logged into an associated user account maintained by the service platform 204 and is currently utilizing a particular one of the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N").

In certain embodiments, the service platform 204 may then select a portion of the received user contextual data and metadata 214 based on information associated with the particular one of the respective users 102A (e.g., "User 1"), 102B (e.g., "User 2"), 102C (e.g., "User 3"), and 102D (e.g., "User N"). For example, in some embodiments, the service platform 204 may aggregate the received user contextual data and metadata 214 via the processing devices 208 (e.g., servers) and apply one or more ML algorithms (e.g., deep learning algorithms) and/or rules-based algorithms to determine one or more associations of the particular one of the respective users 102A (e.g., "User 1"), 102B (e.g., "User 2"), 102C (e.g., "User 3"), and 102D (e.g., "User N"), such as a user destination or application interests, a particular party or group to which the particular one of the respective users 102A (e.g., "User 1"), 102B (e.g., "User 2"), 102C (e.g., "User 3"), and 102D (e.g., "User N") belongs, an account profile of the particular one of the respective users 102A (e.g., "User 1"), 102B (e.g., "User 2"), 102C (e.g., "User 3"), and 102D (e.g., "User N"), a privacy profile of the particular one of the respective users 102A (e.g., "User 1"), 102B (e.g., "User 2"), 102C (e.g., "User 3"), and 102D (e.g., "User N"), and/or other contextually rich data that may be associated with the particular one of the respective users 102A (e.g., "User 1"), 102B (e.g., "User 2"), 102C (e.g., "User 3"), and 102D (e.g., "User N").

In certain embodiments, the service platform 204 may then generate and transmit output data 216 for the particular one of the users 102A (e.g., "User 1"), 102B (e.g., "User 2"), 102C (e.g., "User 3"), and 102D (e.g., "User N") based on the selected portion of the received user contextual data and metadata 214. For example, in some embodiments, the service platform 204 may generate output data 216 for a particular one of the users 102A (e.g., "User 1"), 102B (e.g., "User 2"), 102C (e.g., "User 3"), and 102D (e.g., "User N") to be provided, for example, to the artificial reality applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") executing on the artificial reality devices 104A, 104B, 104C, and 104D and/or other electronic device 218A, 218B, 218C, and 218D associated with the particular user.

For example, in some embodiments, the output data 216 may include one or more recommendations 212A, 212B, 212C, and 212D (e.g., destination data, activity data, and other data) of a particular destination of another one of the users 102A (e.g., "User 1"), 102B (e.g., "User 2"), 102C (e.g., "User 3"), and 102D (e.g., "User N") within a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"); an activity status of another one of the users 102A (e.g., "User 1"), 102B (e.g., "User 2"), 102C (e.g., "User 3"), and 102D (e.g., "User N"); a user capacity at a particular destination or within a particular one of the applications or experiences 202A (e.g., "Artificial Reality Experience 1") 202B (e.g., "Artificial Reality Experience 2"), 202C (e.g., "Artificial Reality Experience 3"), and 202D (e.g., "Artificial Reality Experience N"); a popularity of a particular destination or a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"); a remaining time of a current experience at a particular destination or within a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"); an indication of whether another one of the users 102A (e.g., "User 1"), 102B (e.g., "User 2"), 102C (e.g., "User 3"), and 102D (e.g., "User N") are joinable at a particular destination or within a particular one of the applications or experiences 202A (e.g., "Artificial Reality Experience 2"), 202B (e.g., "Artificial Reality Experience 2"), 202C (e.g., "Artificial Reality Experience 3"), and 202D (e.g., "Artificial Reality Experience N"); an indication of whether another one of the users 102A (e.g., "User 1"), 102B (e.g., "User 2"), 102C (e.g., "User 3"), and 102D (e.g., "User N") desire that additional users join in on an experience at a particular destination or within a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"); a particular artificial reality event of determined interest to a particular one of the users 102A (e.g., "User 1"), 102B (e.g., "User 2"), 102C (e.g., "User 3"), and 102D (e.g., "User N"); and/or other contextually rich data that may be of determined interest to a particular one of the users 102A (e.g., "User 1"), 102B (e.g., "User 2"), 102C (e.g., "User 3"), and 102D (e.g., "User N").

In certain embodiments, in addition to the aforementioned recommendations 212A, 212B, 212C, and 212D, the output data 216 may also include one or more deep links 220A, 220B, 220C, and 220D to a particular destination within a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N"). In one embodiment, the one or more deep links 220A, 220B, 220C, and 220D may include an address of a destination (e.g., web address to a particular destination, a pathname to a particular destination, a pointer to a particular destination, a virtual memory address to a particular destination, or other addressing link) that may be provided to the other electronic devices 218A, 218B, 218C, and 218D (e.g., electronic devices incapable of executing the artificial reality applications or experiences 202A, 202B, 202C, and 202D) associated with the respective users 102A (e.g., "User 1"), 102B (e.g., "User 2"), 102C (e.g., "User 3"), and 102D (e.g., "User N").

In another embodiment, the one or more deep links 220A, 220B, 220C, and 220D may include a Uniform Resource Locator (URL) or a Uniform Resource Indicator (URI) link (e.g., website link, hyperlink, URL, URI) of a particular destination that may be provided to the other electronic devices 218A, 218B, 218C, and 218D associated with the respective users 102A (e.g., "User 1"), 102B (e.g., "User 2"), 102C (e.g., "User 3"), and 102D (e.g., "User N"). For example, in some embodiments, the one or more deep links 220A, 220B, 220C, and 220D may be provided to the electronic devices 218A, 218B, 218C, and 218D associated with the respective users 102A (e.g., "User 1"), 102B (e.g., "User 2"), 102C (e.g., "User 3"), and 102D (e.g., "User N"), such that once a particular one of the users 102A (e.g., "User 1"), 102B (e.g., "User 2"), 102C (e.g., "User 3"), and 102D (e.g., "User N") launches a respective one of the respective deep links 220A, 220B, 220C, and 220D, the corresponding one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N") may be instantiated at the particular destination (e.g., within another one of the artificial reality applications or experiences 202A, 202B, 202C, and 202D) to which the launched deep link is directed. That is, the one or more deep links 220A, 220B, 220C, and 220D, once launched or selected, may instantaneously or near-instantaneously "teleport" (e.g., virtually transport instantaneously or near-instantaneously) users directly to the particular destination (e.g., a predefined virtual location, a virtual place, a virtual community, a virtual lobby, a virtual microcosm, a virtual macrocosm, a video gaming level, a video gaming competition, a video gaming mode, a particular longitudinal and latitudinal intersection, or other particular position or point in space for user join-ups within a particular artificial reality application).

In this way, the present techniques of generating and publishing deep links to rich presence destinations within artificial reality applications may facilitate users of artificial reality devices in directly joining with associated users (e.g., friends) in experiences within artificial reality applications. Specifically, the present techniques may allow for the engendering of an artificial reality cosmos that is perceptible and navigable in the very same manner as would be a real-world destination (e.g., real-world place). Thus, the present techniques may allow users of artificial reality applications and devices to more efficiently navigate (e.g., instantaneously or near-instantaneously) to and from different destinations across artificial reality environments, and, further, to more efficiently and meaningfully associate and collaborate with other users of artificial reality applications and devices across various artificial reality environments.

Figure 3:
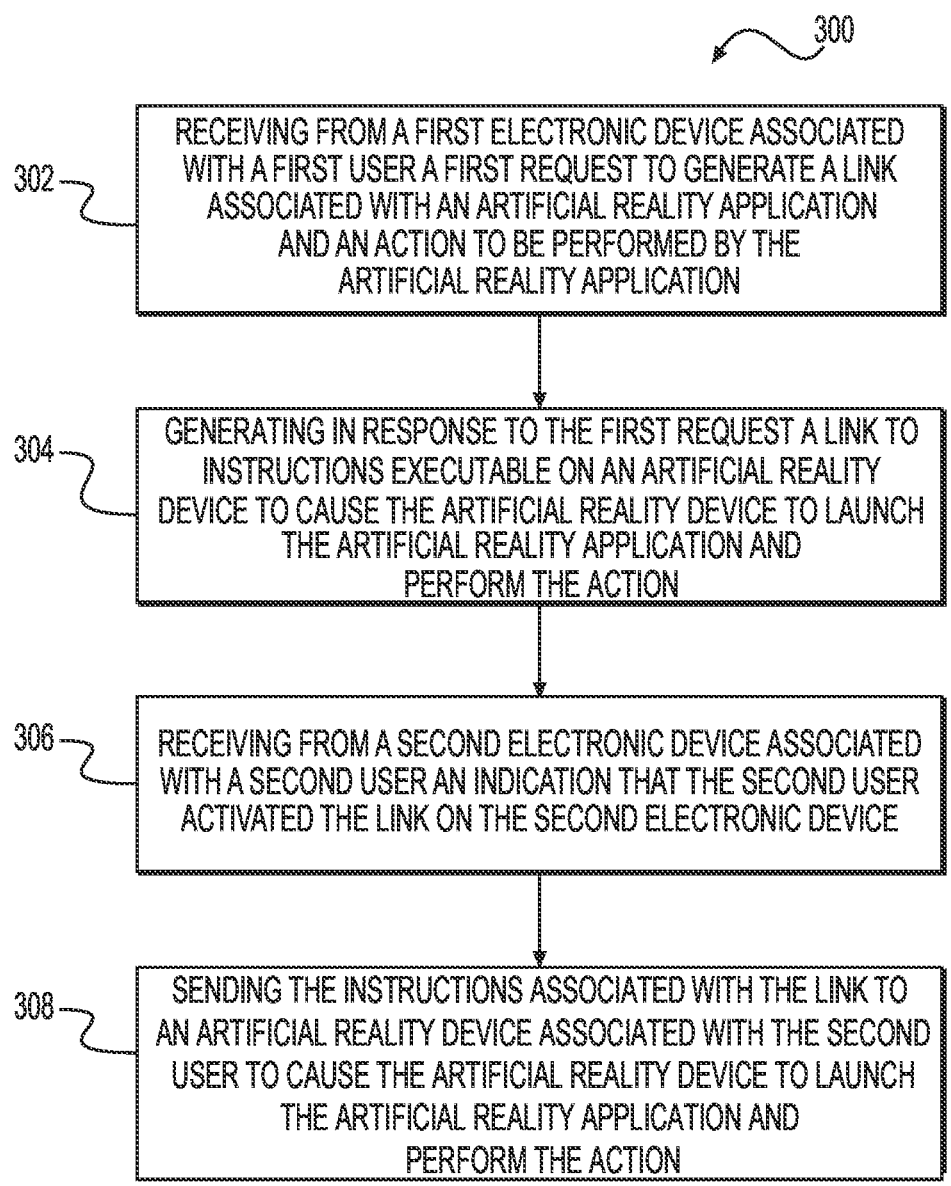
FIG. 3 illustrates a flow diagram of a method for generating and publishing deep links to rich presence destinations, in accordance with the present embodiments.

FIG. 3 illustrates is a flow diagram of a method 300 for generating and publishing deep links to rich presence destinations, in accordance with the presently disclosed embodiments. The method 300 may be performed utilizing one or more processing devices (e.g., service platform 204) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 300 may begin at block 302 with one or more processing devices (e.g., service platform 204) receiving from a first electronic device associated with a first user a first request to generate a link associated with an artificial reality application and an action to be performed by the artificial reality application. For example, as previously discussed, the service platform 204 may receive a request from, for example, the electronic device 218A corresponding to the user 102A (e.g., "User 1") to generate a deep link 220A to a specific destination within, for example, the artificial reality application or experience 202A (e.g., "Artificial Reality Experience 1"). The method 300 may continue at block 304 with the one or more processing devices (e.g., service platform 204) generating, in response to the first request, a link to instructions that are executable on an artificial reality device to cause the artificial reality device to launch the artificial reality application and perform the action. For example, in one embodiment, the service platform 204 may generate a deep link 220A or 220B to a specific destination within, for example, the artificial reality application or experience 202A (e.g., "Artificial Reality Experience 1"). In some embodiments, the service platform 204 may provide the deep link 220A and/or deep link 220B to the electronic devices 218A and 218B corresponding to users 102A (e.g., "User 1") and 102B (e.g., "User 2"), respectively.

The method 300 may then continue at block 306 with the one or more processing devices (e.g., service platform 204) receiving, from a second electronic device associated with a second user, an indication that the second user activated the link on the second electronic device. For example, in one embodiment, the service platform 204 may receive from the electronic device 218B, for example, an indication that the user 102B (e.g., "User 2") activated (e.g., clicked-on) the deep link 220B on the electronic device 218B corresponding to the user 102B (e.g., "User 2"). The method 300 may then continue at block 308 with the one or more processing devices (e.g., service platform 204) sending the instructions associated with the link to an artificial reality device associated with the second user to cause the artificial reality device associated with the second user to launch the artificial reality application and perform the action.

For example, as previously discussed above with respect to FIG. 2, the service platform 204 may provide data to, for example, the artificial reality device 104B corresponding to the user 102B (e.g., "User 2"), such that once the user 102B (e.g., "User 2") launches the deep link 220B, the application or experience 202A (e.g., "Artificial Reality Experience 1") may be instantiated at the particular destination (e.g., within the artificial reality application or experience 202A) to which the selected or launched deep link 220B is directed. That is, the one or more deep links 220A, 220B, 220C, and 220D may "teleport" (e.g., virtually transport instantaneously or near-instantaneously) users directly to a particular destination (e.g., a predefined virtual location, a virtual place, a virtual community, a virtual lobby, a virtual microcosm, a virtual macrocosm, a video gaming level, a video gaming competition, a video gaming mode, a particular longitudinal and latitudinal intersection, or other particular position or point in space for user join-ups within a particular artificial reality application) within a particular one of the applications or experiences 202A (e.g., "Artificial Reality Experience 1"), 202B (e.g., "Artificial Reality Experience 2"), 202C (e.g., "Artificial Reality Experience 3"), and 202D (e.g., "Artificial Reality Experience N").

In this way, the present techniques of generating and publishing deep links to rich presence destinations within artificial reality applications may facilitate users of artificial reality devices in directly joining with associated users (e.g., friends) in experiences within artificial reality applications. Specifically, the present techniques may allow for the engendering of an artificial reality cosmos that is perceptible and navigable in the very same manner as would be a real-world destination (e.g., real-world place). Thus, the present techniques may allow users of artificial reality applications and devices to more efficiently navigate (e.g., instantaneously or near-instantaneously) to and from different destinations across artificial reality environments, and, further, to more efficiently and meaningfully associate and collaborate with other users of artificial reality applications and devices across various artificial reality environments.

Figure 4:
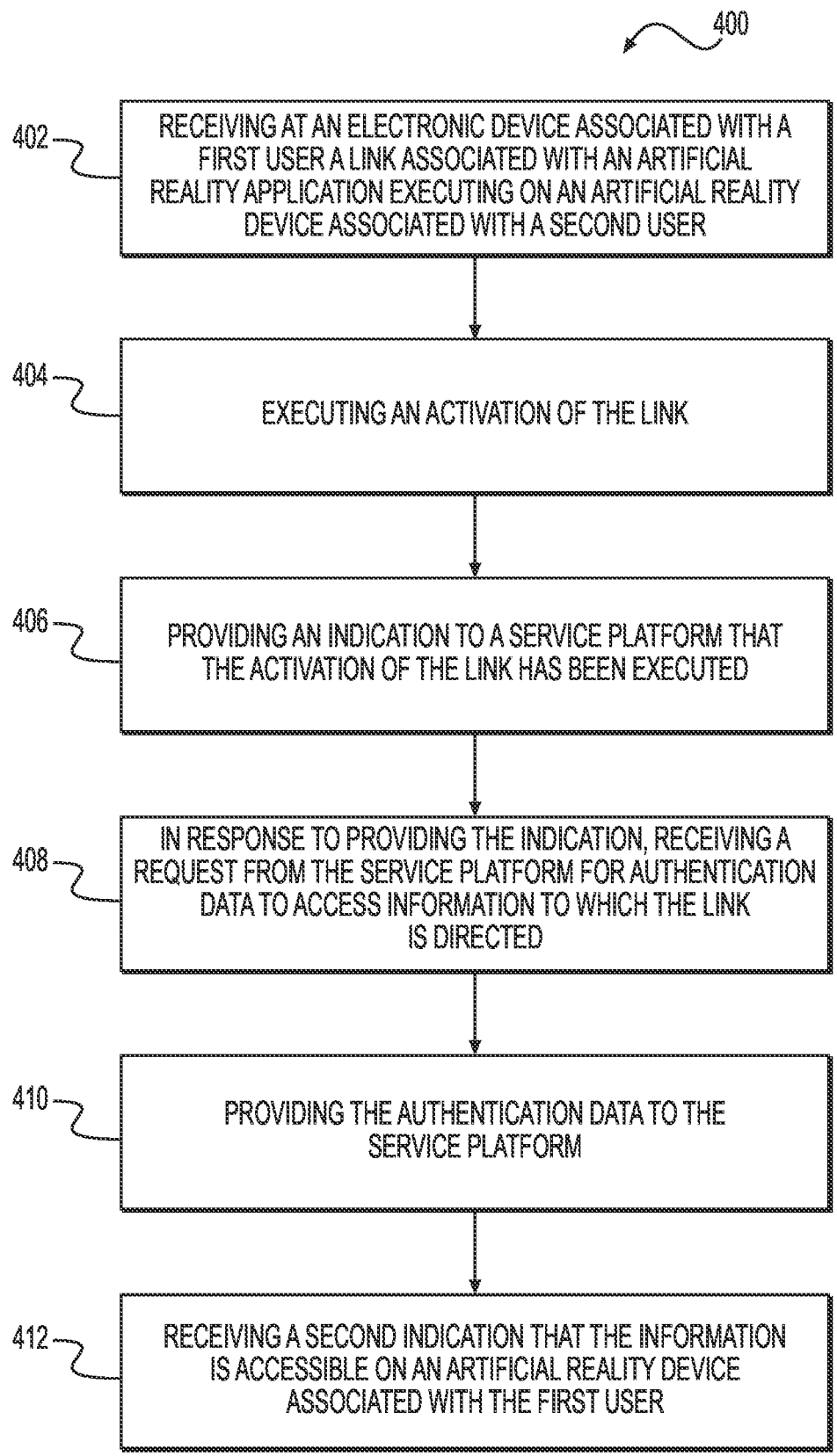
FIG. 4 illustrates a flow diagram of a method for receiving and publishing rich presence destinations within artificial reality applications, in accordance with the present embodiments.

FIG. 4 illustrates is a flow diagram of a method 400 for receiving and sharing deep links to rich presence destinations within artificial reality applications, in accordance with the presently disclosed embodiments. The method 400 may be performed utilizing one or more processing devices (e.g., electronic device 218A) that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing image data), software (e.g., instructions running/executing on one or more processors), firmware (e.g., microcode), or any combination thereof.

The method 400 may begin at block 402 with one or more processing devices (e.g., electronic device 218A) receiving, at an electronic device associated with a first user, a link associated with an artificial reality application executing on an artificial reality device associated with a second user. For example, the electronic device 218A corresponding to the user 102A (e.g., "User 1") may receive a deep link 220A to a specific destination within, for example, the artificial reality application or experience 202B (e.g., "Artificial Reality Experience 2") corresponding to the user 102B (e.g., "User 2"). In one embodiment, the electronic device 218A may receive the deep link 220A and/or deep link 220B directly from the electronic device 218B (e.g., via a short message service (SMS) message, a multimedia messaging service (MMS) message, an email, a social media posting, a website publication, an instant message, a peer-to-peer (P2P) message, or other notification). In another embodiment, the electronic device 218A may receive the deep link 220A from the service platform 204, for example, over the one or more networks 206. The method 400 may continue at block 404 with the one or more processing devices (e.g., electronic device 218A) executing an activation of the link. For example, the user 102A (e.g., "User 1") may activate (e.g., click-on) the deep link 220A on the electronic device 218A corresponding to the user 102A (e.g., "User 1"). The method 400 may then continue at block 406 with the one or more processing devices (e.g., electronic device 218A) providing an indication to a service platform that the activation of the link has been executed. For example, the electronic device 218A may provide an indication (e.g., notification) to the service platform 204 that the user 102A (e.g., "User 1") activated (e.g., clicked-on) the deep link 220A on the electronic device 218A corresponding to the user 102A (e.g., "User 1").

In response to providing the indication, the method 400 may then continue at block 408 with the one or more processing devices (e.g., electronic device 218A) receiving a request from the service platform for authentication data to access information to which the link is directed. For example, the electronic device 218A may receive a user prompt from the service platform 204 for the user 102A (e.g., "User 1") to enter a password, a biometric input, a facial recognition capture, or other authentication information to log into a user account corresponding to the user 102A (e.g., "User 1") and maintained by the service platform 204. The method 400 may then continue at block 410 with the one or more processing devices (e.g., electronic device 218A) providing the authentication data to the service platform. The method 400 may then conclude at block 412 with the one or more processing devices (e.g., electronic device 218A) receiving a second indication that the information is accessible on an artificial reality device associated with the first user.

For example, in some embodiments, the electronic device 218A may receive a notification from the service platform 204, indicating that the user 102A (e.g., "User 1") may access and navigate (e.g., utilizing the artificial reality device 104A corresponding to the user 102A) to a particular destination within, for example, the artificial reality application or experience 202B (e.g., "Artificial Reality Experience 2") to which the launched deep link 220A is directed. In other embodiments, the electronic device 218A may be directed to, for example, a designated webpage (e.g., designated web preview) and display a user prompt, which may prompt the user 102A (e.g., "User 1") to select, for example, whether to launch the artificial reality application or experience 202B (e.g., "Artificial Reality Experience 2") to which the launched deep link 220A is directed utilizing the artificial reality device 104A corresponding to the user 102A (e.g., "User 1") or one or more other artificial reality devices that may be associated with the user 102A (e.g., "User 1"). For example, in one embodiment, the designated webpage (e.g., designated web preview) displayed on the electronic device 218A may include a selectable list of each artificial reality device associated with a user account corresponding to the user 102A (e.g., "User 1"). Thus, once the particular user 102A (e.g., "User 1") may then place on, for example, the artificial reality device 104A corresponding to the user 102A (e.g., "User 1"), the user 102A (e.g., "User 1") may be "teleported" (e.g., virtually transported instantaneously or near-instantaneously) to the particular destination within, for example, the artificial reality application or experience 202B (e.g., "Artificial Reality Experience 2") to which the launched deep link 220A is directed.

In certain embodiments, the service platform 204 may have stored a number of deep links each corresponding to the user 102A (e.g., "User 1"), for instance. Specifically, in some embodiments, the service platform 204 may store any number of generated deep links (e.g., deep links 220A, 220B, 220C, and 220D) that may be associated with a particular user 102A (e.g., "User 1") into a queue or a stack within the one or more data stores 210 (e.g., internal databases). For example, in one embodiment, the service platform 204 may store any number of generated deep links (e.g., deep links 220A, 220B, 220C, and 220D) that may be associated with a particular user 102A (e.g., "User 1") into a last-in-last-out (LIFO) stack, such that the service platform 204 may provide to the electronic device 218A only the most recent of the stored deep links (e.g., deep links 220A, 220B, 220C, and 220D). In one embodiment, the service platform 204 may then discard the least recent of the stored deep links (e.g., deep links 220A, 220B, 220C, and 220D). In another embodiment, the service platform 204 may keep the stored deep links (e.g., deep links 220A, 220B, 220C, and 220D) in the LIFO stack until, for example, an expiration time elapse. For example, in some embodiments, the stored deep links (e.g., deep links 220A, 220B, 220C, and 220D) may be kept, for example, for a 30-minute time period, a 60-minute time period, a 120-minute time period, a 240-minute time period, or up to a 24-hour time period before being discarded.

Figure 5:
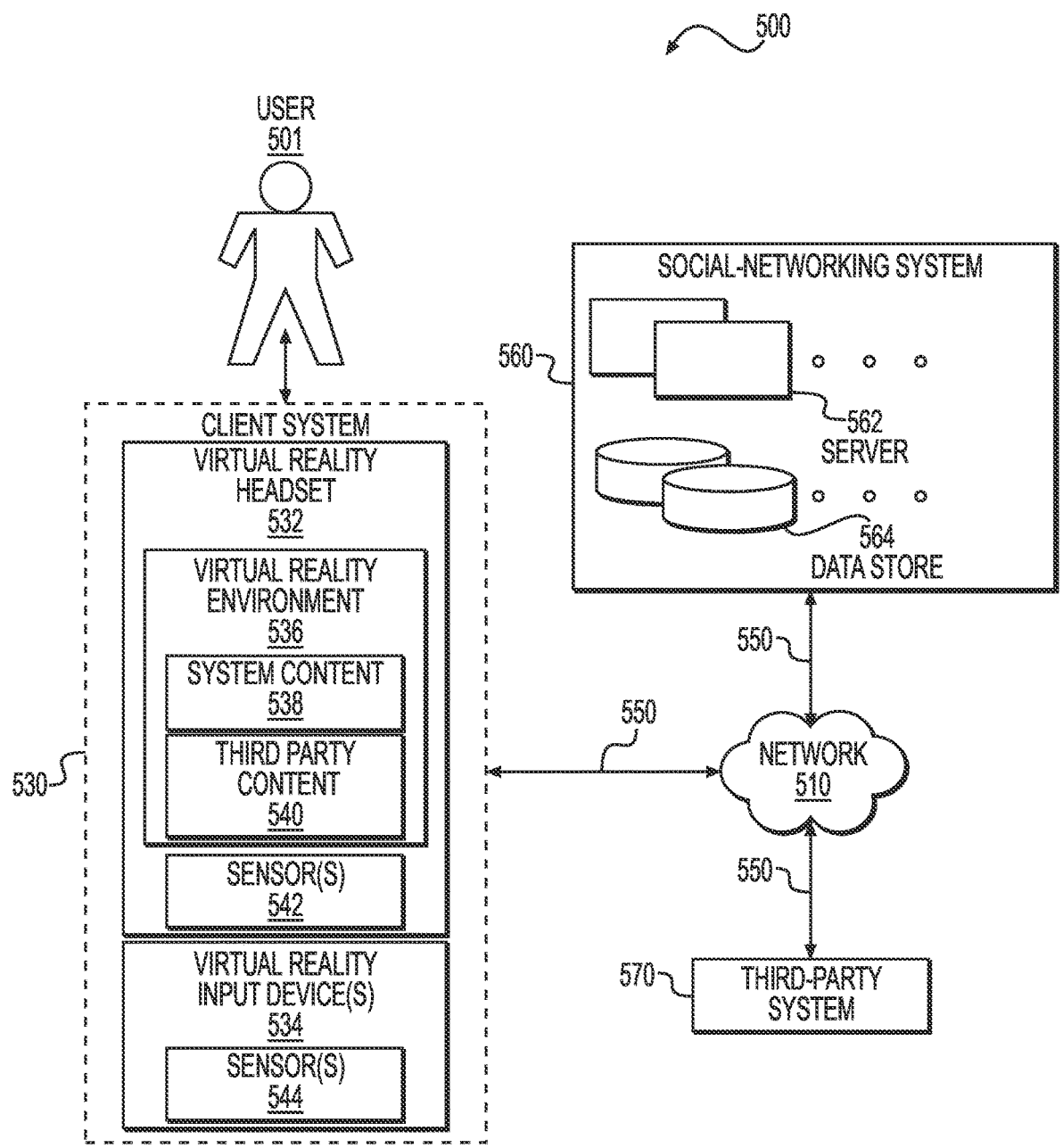
FIG. 5 illustrates an example network environment associated with a virtual reality system, in accordance with the present embodiments.

FIG. 5 illustrates an example network environment 500 associated with a virtual reality system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example, and not by way of limitation, two or more of users 501, a client system 530, a social-networking system 560, and a third-party system 570 may be connected to each other directly, bypassing a network 510. As another example, two or more of client systems 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example, and not by way of limitation, network environment 500 may include multiple users 501, client systems 530, social-networking systems 560, third-party systems 570, and networks 510.

This disclosure contemplates any suitable network 510. As an example, and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510. Links 550 may connect a client system 530, a social-networking system 560, and a third-party system 570 to a communication network 510 or to each other. This disclosure contemplates any suitable links 550. In certain embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In certain embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In certain embodiments, a client system 530 may be an electronic device including hardware, software, or embedded logic components or a combination of two or more such components and capable of carrying out the appropriate functionalities implemented or supported by a client system 530. As an example, and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In certain embodiments, a client system 530 may include a virtual reality (or augmented reality) headset 532, such as OCULUS RIFT and the like, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset.

Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively, or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g. a webpage) based on the HTML files from the server for presentation to the user. This disclosure contemplates any suitable source files. As an example, and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In certain embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example, and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In certain embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof.

In certain embodiments, each server 562 may include hardware, software, or embedded logic components or a combination of two or more such components for carrying out the appropriate functionalities implemented or supported by server 562. In certain embodiments, the social-networking system 560 may include one or more data stores 564. Data stores 564 may be used to store various types of information. In certain embodiments, the information stored in data stores 564 may be organized according to specific data structures. In certain embodiments, each data store 564 may be a relational, columnar, correlation, or other suitable database. Although this disclosure describes or illustrates particular types of databases, this disclosure contemplates any suitable types of databases. Certain embodiments may provide interfaces that enable a client system 530, a social-networking system 560, or a third-party system 570 to manage, retrieve, modify, add, or delete, the information stored in data store 564.

In certain embodiments, the social-networking system 560 may store one or more social graphs in one or more data stores 564. In certain embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In certain embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In certain embodiments, the social-networking system 560 may provide users with the ability to take actions on various types of items or objects, supported by the social-networking system 560. As an example, and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In certain embodiments, the social-networking system 560 may be capable of linking a variety of entities. As an example, and not by way of limitation, the social-networking system 560 may enable users to interact with each other as well as receive content from third-party systems 570 or other entities, or to allow users to interact with these entities through an application programming interfaces (API) or other communication channels. In certain embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In certain embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In certain embodiments, a third-party system 570 may include a third-party content object provider. A third-party content object provider may include one or more sources of content objects, which may be communicated to a client system 530. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In certain embodiments, the social-networking system 560 also includes user-generated content objects, which may enhance a user's interactions with the social-networking system 560. User-generated content may include anything a user can add, upload, send, or "post" to the social-networking system 560. As an example, and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream. In certain embodiments, the social-networking system 560 may include a variety of servers, sub-systems, programs, modules, logs, and data stores. In certain embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof.

In certain embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
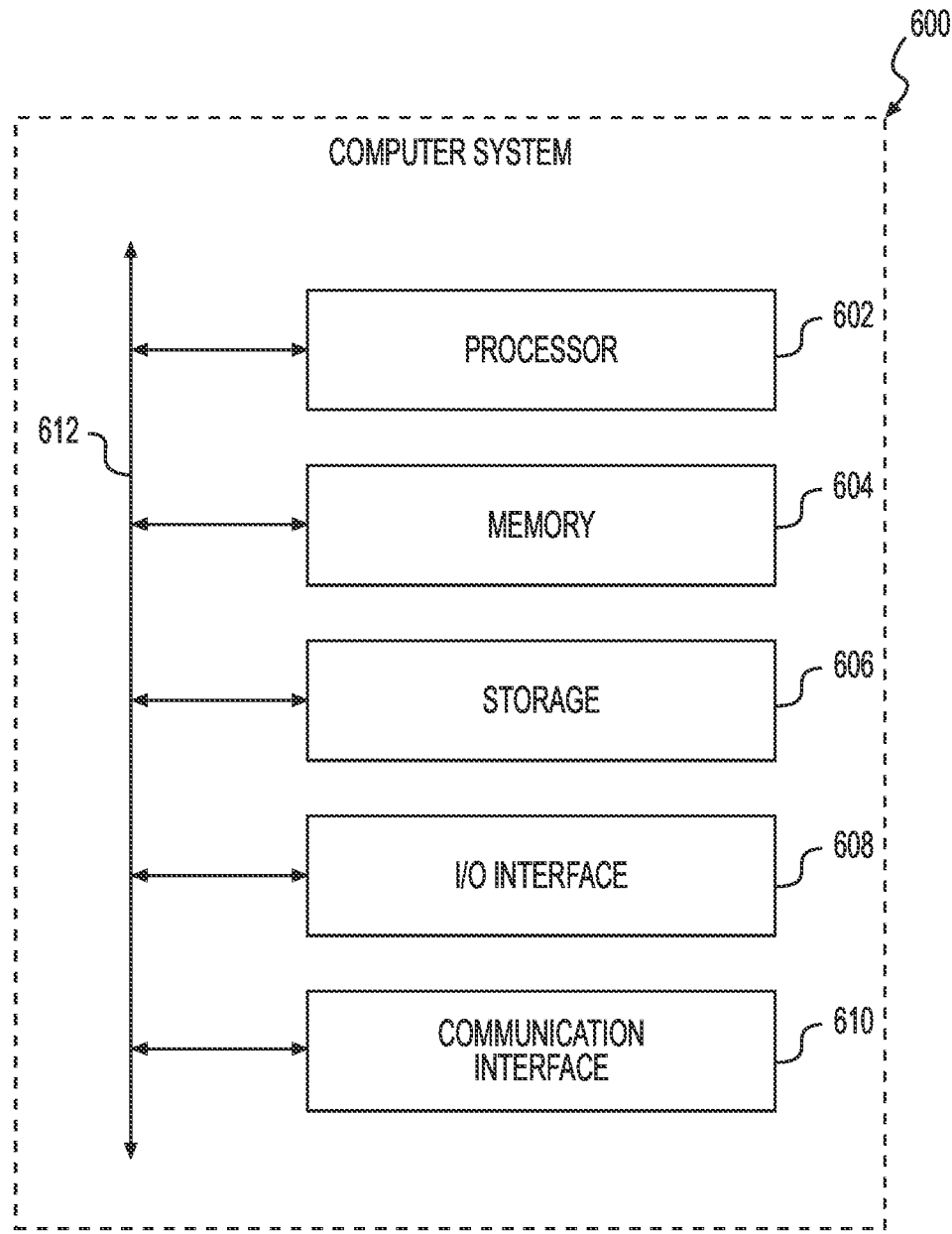
FIG. 6 illustrates an example computer system, in accordance with the present embodiments.

FIG. 6 illustrates an example computer system 600 that may be useful in performing one or more of the foregoing techniques as presently disclosed herein. In certain embodiments, one or more computer systems 600 perform one or more steps of one or more methods described or illustrated herein. In certain embodiments, one or more computer systems 600 provide functionality described or illustrated herein. In certain embodiments, software running on one or more computer systems 600 performs one or more steps of one or more methods described or illustrated herein or provides functionality described or illustrated herein. Certain embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In certain embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In certain embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In certain embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In certain embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In certain embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In certain embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In certain embodiments, one or more memory management units (MMUs) reside between processor 602 and memory 604 and facilitate accesses to memory 604 requested by processor 602. In certain embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In certain embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In certain embodiments, storage 606 is non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In certain embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In certain embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In certain embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method comprising, by a computing system associated with an artificial reality platform:
associating a user account corresponding to a first user with an electronic device and a particular artificial reality device;
receiving, from the electronic device associated with the first user, an indication that the first user activated a link on the electronic device, the electronic device being a mobile device, a tablet computer, a computer, or a laptop different from the particular artificial reality device, wherein the link is associated with an artificial reality application and an action to be performed by the artificial reality application;
sending, to the electronic device, an option to select from one or more artificial reality devices associated with the user account to launch the artificial reality application and perform the action associated with the link;
receiving, from the electronic device, a selection of the particular artificial reality device to launch the artificial reality application and perform the action associated with the link; and
responsive to receiving the indication that the first user activated the link on the electronic device and the selection of the particular artificial reality device, sending instructions associated with the link to the particular artificial reality device to cause the particular artificial reality device associated to launch the artificial reality application and perform the action when the first user wears the particular artificial reality device.

2. The method of claim 1, wherein the user account corresponding to the first user is associated with a plurality of artificial reality devices.

3. The method of claim 1, further comprising displaying, on the electronic device, a selectable list of the one or more artificial reality devices associated with the user account.

4. The method of claim 1, wherein the action comprises launching the artificial reality application on the selected device to a first destination in the artificial reality application.

5. The method of claim 1, further comprising associating a description and an image together with the link.

6. The method of claim 1, wherein generating the link to instructions that are executable on an artificial reality device comprises generating a link to additional instructions that are executable on the electronic device.

7. The method of claim 1, wherein the link associated with the artificial reality application comprises an activity status of a second user.

8. The method of claim 1, wherein the link comprises a link to a website.

9. The method of claim 1, further comprising providing the link to the instructions that are executable on an artificial reality device to the electronic device for publishing.

10. A system comprising:
one or more non-transitory computer-readable storage media including instructions; and
one or more processors coupled to the storage media, the one or more processors configured to execute the instructions to:
associate a user account corresponding to a first user with an electronic device and a particular artificial reality device;
receive, from the electronic device associated with the first user, an indication that the first user activated a link on the electronic device, the electronic device being a mobile device, a tablet computer, a computer, or a laptop different from the particular artificial reality device, wherein the link is associated with an artificial reality application and an action to be performed by the artificial reality application;
send, to the electronic device, an option to select from one or more artificial reality devices associated with the user account to launch the artificial reality application and perform the action associated with the link;
receive, from the electronic device, a selection of the particular artificial reality device to launch the artificial reality application and perform the action associated with the link; and
responsive to receiving the indication that the first user activated the link on the electronic device and the selection of the particular artificial reality device, send instructions associated with the link to the particular artificial reality device to cause the particular artificial reality device associated to launch the artificial reality application and perform the action when the first user wears the particular artificial reality device.

11. The system of claim 10, wherein the user account corresponding to the first user is associated with a plurality of artificial reality devices.

12. The system of claim 10, wherein the one or more processors are further configured to:
display, on the electronic device, a selectable list of the one or more artificial reality devices associated with the user account.

13. The system of claim 10, wherein the action comprises launching the artificial reality application on the selected device to a first destination in the artificial reality application.

14. The system of claim 10, wherein the one or more processors are further configured to execute the instructions to associate a description and an image together with the link.

15. A non-transitory computer-readable medium comprising instructions that, when executed by one or more processors of a computing system, cause the one or more processors to:
associate a user account corresponding to a first user with an electronic device and a particular artificial reality device;
receive, from the electronic device associated with the first user, an indication that the first user activated a link on the electronic device, the electronic device being a mobile device, a tablet computer, a computer, or a laptop different from the particular artificial reality device, wherein the link is associated with an artificial reality application and an action to be performed by the artificial reality application;
send, to the electronic device, an option to select from one or more artificial reality devices associated with the user account to launch the artificial reality application and perform the action associated with the link;

receive, from the electronic device, a selection of the particular artificial reality device to launch the artificial reality application and perform the action associated with the link; and responsive to receiving the indication that the first user activated the link on the electronic device and the selection of the particular artificial reality device, send instructions associated with the link to the particular artificial reality device to cause the particular artificial reality device associated to launch the artificial reality application and perform the action when the first user wears the particular artificial reality device.

16. The non-transitory computer-readable medium of claim 15, wherein the user account corresponding to the first user is associated with a plurality of artificial reality devices.

17. The non-transitory computer-readable medium of claim 15, wherein the one or more processors are further configured to:
    display, on the electronic device, a selectable list of the one or more artificial reality devices associated with the user account.

18. The non-transitory computer-readable medium of claim 15, wherein the action comprises launching the artificial reality application on the selected device to a first destination in the artificial reality application.

19. The non-transitory computer-readable medium of claim 15, wherein the one or more processors are further configured to execute the instructions to associate a description and an image together with the link.

* * * * *